June 5, 1956  H. D. DRAIN ET AL  2,748,693
FRUIT JUICE EXTRACTOR
Filed Feb. 2, 1951  3 Sheets-Sheet 1

INVENTOR.
Herbert D. Drain,
Winfield S. Griffiths,
By Cromwell, Greist & Warden
Attys

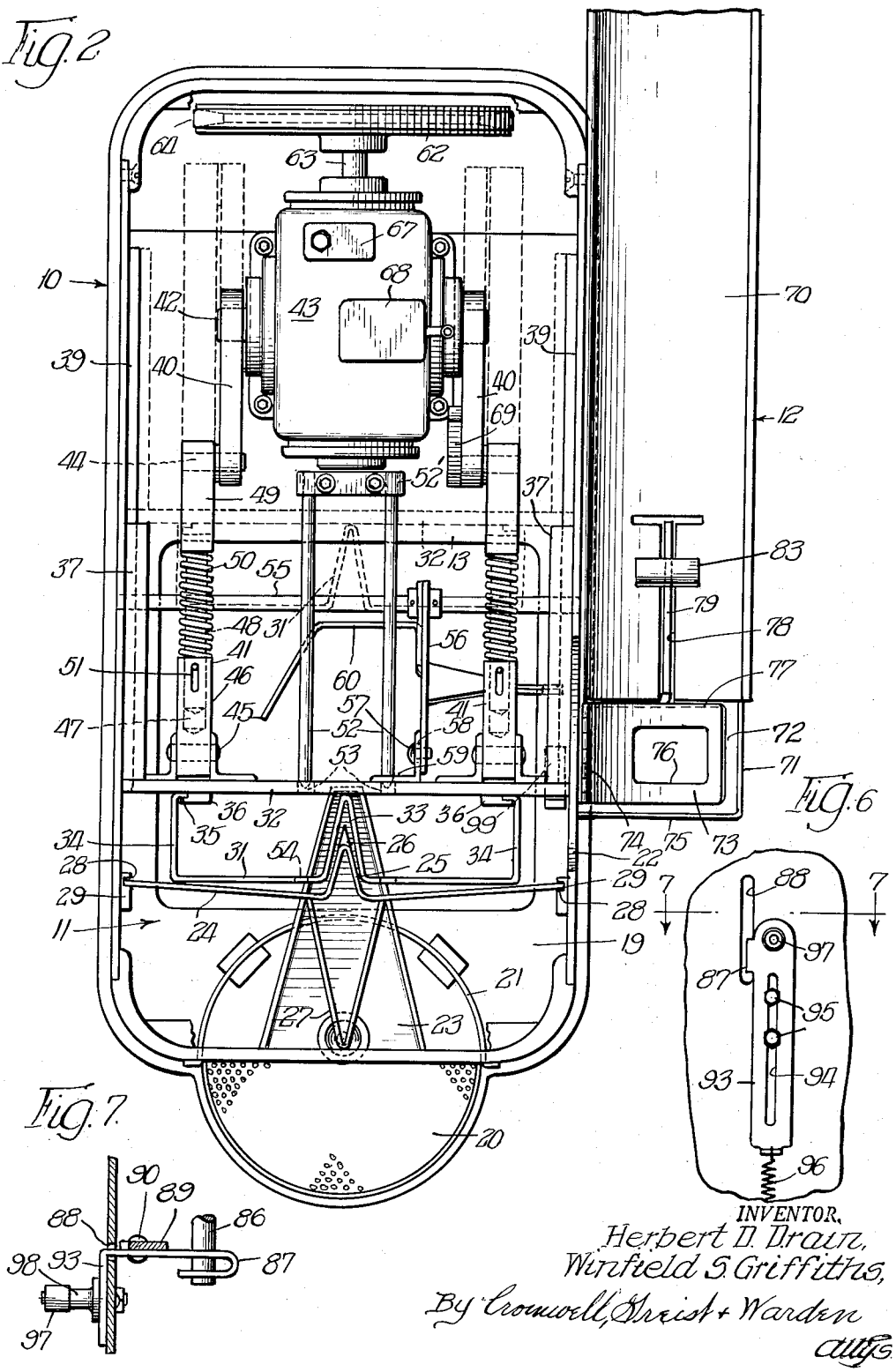

June 5, 1956  H. D. DRAIN ET AL  2,748,693
FRUIT JUICE EXTRACTOR

Filed Feb. 2, 1951  3 Sheets-Sheet 3

INVENTOR.
Herbert D. Drain,
Winfield S. Griffiths,
By Cromwell, Greist & Warden
Attys United States Patent Office 2,748,693
Patented June 5, 1956

2,748,693
FRUIT JUICE EXTRACTOR

Herbert D. Drain, Chicago, and Winfield S. Griffiths, River Forest, Ill.; said Drain assignor to said Griffiths Application February 2, 1951, Serial No. 209,044

5 Claims. (Cl. 100—98)

This invention relates to fruit juice extractors, and is concerned particularly with a machine which will operate automatically to cut successive fruit into halves; which will subject the halves to the action of juice expellers or removers; and which will collect the juice in a receptacle while discharging the crushed skins into a waste container.

It is a general object of the invention to provide a practical, compact and dependable apparatus for efficiently handling and operating upon fruit, such as oranges or the like, to automatically deliver successive fruit into the apparatus, to cut the fruit into halves, to squeeze the juice from the halves, to collect the juice in a receptacle, and to deliver the crushed rind and pulp to a disposal vessel which is preferably located externally of the apparatus.

It is a more specific object of the invention to provide a juice extractor which comprises cooperating presser members, one of which is mounted in a stationary position and incorporates therein a vertically positioned cutting knife, the other of which is mounted for horizontal reciprocating movement and power means for reciprocating the movable pressure member to operate on a succession of the fruits delivered between the presser members by a cooperating feeding device.

It is another object of the invention to provide a fruit juicer which comprises a casing having removably mounted therein a presser plate in a relatively fixed position and provided with a vertically extending cutting knife intermediate its side edges in combination with a horizontally reciprocating pressure plate having a center slot for accommodating the cutting knife and being mounted for reciprocation toward and from the fixed presser plate whereby successive pieces of fruit may be introduced between the presser plates and halved by the knife upon reciprocation of the same for removal of the juice from the halves and automatic disposal of the rind and the juice.

It is a further object of the invention to provide a juice extractor which comprises vertically extending presser members one of which is mounted for reciprocation relative to the other, in combination with a feed mechanism so constructed that it automatically introduces successive oranges between the presser members in timed relation to movement of the reciprocable member.

It is another object of the invention to provide a fruit juicer having a pair of presser members, one of which is mounted for automatic reciprocation toward and from the other, a feed mechanism for introducing successive pieces of fruit between the presser members, and a swinging platform member for guiding the fruit into position between the members and for subsequently receiving the crushed rind to deliver the same away from the members.

These and other objects of the invention will be apparent from a consideration of the preferred form of the invention which is shown by way of illustration in the accompanying drawings, wherein:

Fig. 2 is a plan view of the apparatus with the top cover plate removed;

Fig. 6 is a detail of a portion of the operating mechanism for the feeding device;

Fig. 7 is a section on the line 7—7 of Fig. 6; and

Figure 1:
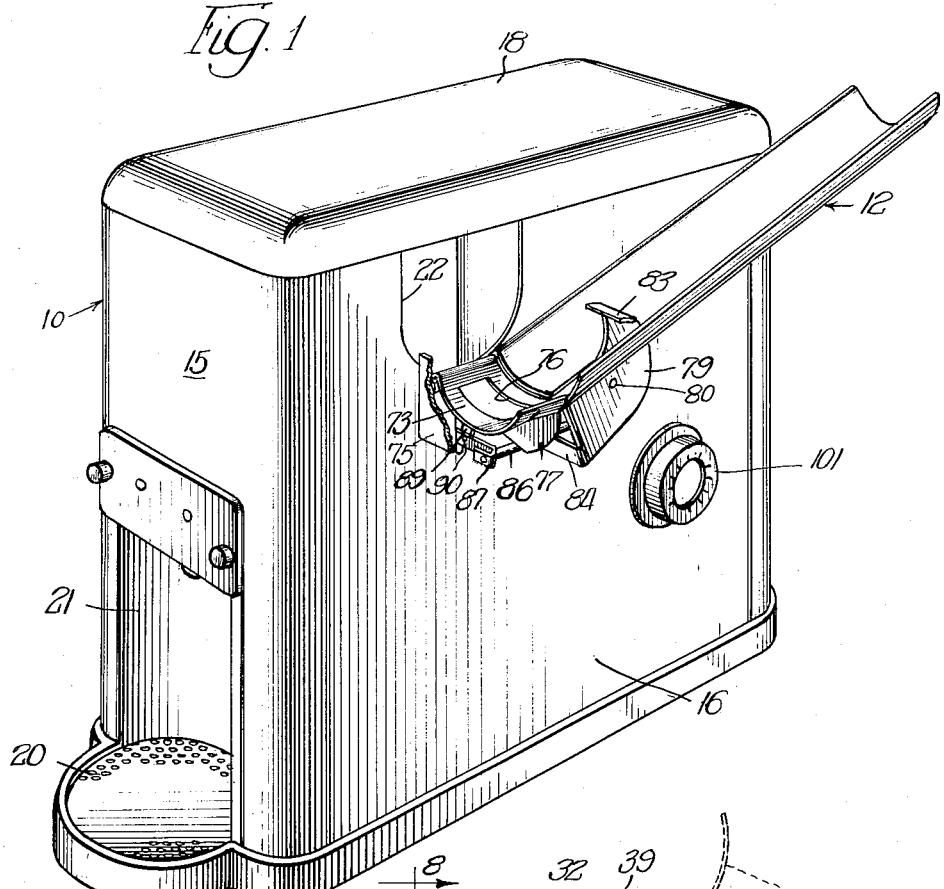
Fig. 1 is a perspective view of an apparatus for extracting juice from oranges or the like which incorporates therein the principal features of the invention.

Referring now to the drawings there is illustrated a fruit juicer which embodies the principles of the invention and which is adapted particularly for use in restaurants, soda fountains or in similar establishments where it is desirable to be able to efficiently extract the juice from any desired number of oranges, or similar fruit, in a rapid and efficient manner.

The illustrated juicer comprises a housing or compartment forming casing 10 in which the juicer mechanism 11 is enclosed and a fruit feed device 12 which is mounted on the one side of the housing.

The housing 10 is characterized by a bottom 13, upstanding end walls 14 and 15, upstanding side walls 16 and 17 and a cover plate 18 which is provided on the top of the casing and which may be readily removed for cleaning or repair of the mechanism 11. The bottom 13 is apertured at 19 and the casing 10 is adapted to be positioned with the aperture 19 in register with a refuse receptacle into which the rind is dumped. The bottom 13 has a forwardly projecting portion 20 which is adapted to support a glass or other receptacle for the juice. A recess is provided in the front wall 15 by means of a curved plate 21 secured in an aperture therein for accommodating the receptacle. The side wall 16 is apertured at 22 for receiving the oranges or other fruit from the feeding device 12.

A tray-like juice collecting chute 23 is secured to the interior of the front wall 15 in a forwardly inclined relation thereto and extends forwardly resting on the top of the recess forming plate 21 to deliver the juice to the serving receptacle which may be placed on the bottom extension 20.

A fixed squeezing or presser plate member 24 is mounted above the collecting tray 23 which may be conveniently formed by bending a generally rectangular plate member to provide a V-shaped ridge 25 in the center thereof. A cutting knife 26 having a sharpened edge extending rearwardly of the casing is secured on the V-shaped ridge portion 25 of the plate 24. A V-shaped stiffening plate 27 extends from the presser plate 24 forwardly into abutting relation with the interior of the front wall 15. The ends of the presser plate 24 are received in vertical grooves 28 in guideway forming and supporting blocks 29 secured to the side walls 16 and 17 above the chute 23. The presser plate 24 and knife unit 26 may be removed in a vertical upward direction to facilitate cleaning of the same. The presser plate 24 is provided with a series of horizontal vertically spaced slots 30 in the walls forming the V-shaped ridge 25 adjacent the knife 26 which permit the juice to pass through the plate 24 and drain down into the chute 23 without passing the seeds or any substantial proportion of the pulp which is squeezed out of the fruit.

A movable squeezing or presser plate member 31 is mounted on a vertical support plate 32 which forms the forward portion of a horizontally reciprocating carriage. The presser member 31 may be conveniently formed from a generally rectangular single plate member which is bent at the middle to provide a recess 33 of V-shaped cross section for receiving the knife 26 and ridge formation 25 of the presser member 24 as the member 31 is moved into pressing relation with the member 24. The presser member 31 is bent at the end edges to form channel-like members 34 which are slidably engaged in recesses 35 in supporting blocks 36 positioned on the front of the carriage plate 32 so that presser member 31 may be readily removed for cleaning.

The carriage on which the movable presser member 31 is supported is arranged to reciprocate horizontally relative to the fixed presser member 24. The support plate 32 is secured at its side edges to side plates 37 which have horizontally extending guideway forming recesses 38 for receiving guide bars or rods 39 secured on the side walls 16 and 17 and forming a track for the carriage.

The carriage is reciprocated by means of crank arms 40 and connecting links 41 (Fig. 2). The crank arms 40 are connected at one end to the power shaft 42 of a change speed device 43 which is mounted at the upper end of the rear of the machine. At the other end the crank arms 40 are pivotally connected at 44 to the one end of the connecting links or pitmans 41. The other end of each pitman 41 is connected by a pivot member 45 to the rear of the support plate 32. Each of the pitmans 41 comprises a forward end member 46 having a recess 47 which receives a bolt or pin 48 on the other end 49 of the pitman and which is surrounded by a compression spring 50. A pin and slot connection 51 limits the extent of movement of the two end members 46 and 49 of the pitman 41 while the spring 50 provides a cushion for the forward movement of the carriage when the fruit is squeezed between the presser plates 24 and 31. A pair of supporting rods 52 extend forwardly of a bracket 52' on a cross plate supporting the change speed device, through apertures 53 in the head plate 32 and aligned apertures 54 in the presser member 31. These rods 52 support the fruit as the fruit is positioned in front of the knife 26 and moved toward the same by the movement of the presser member 31.

Figure 3:
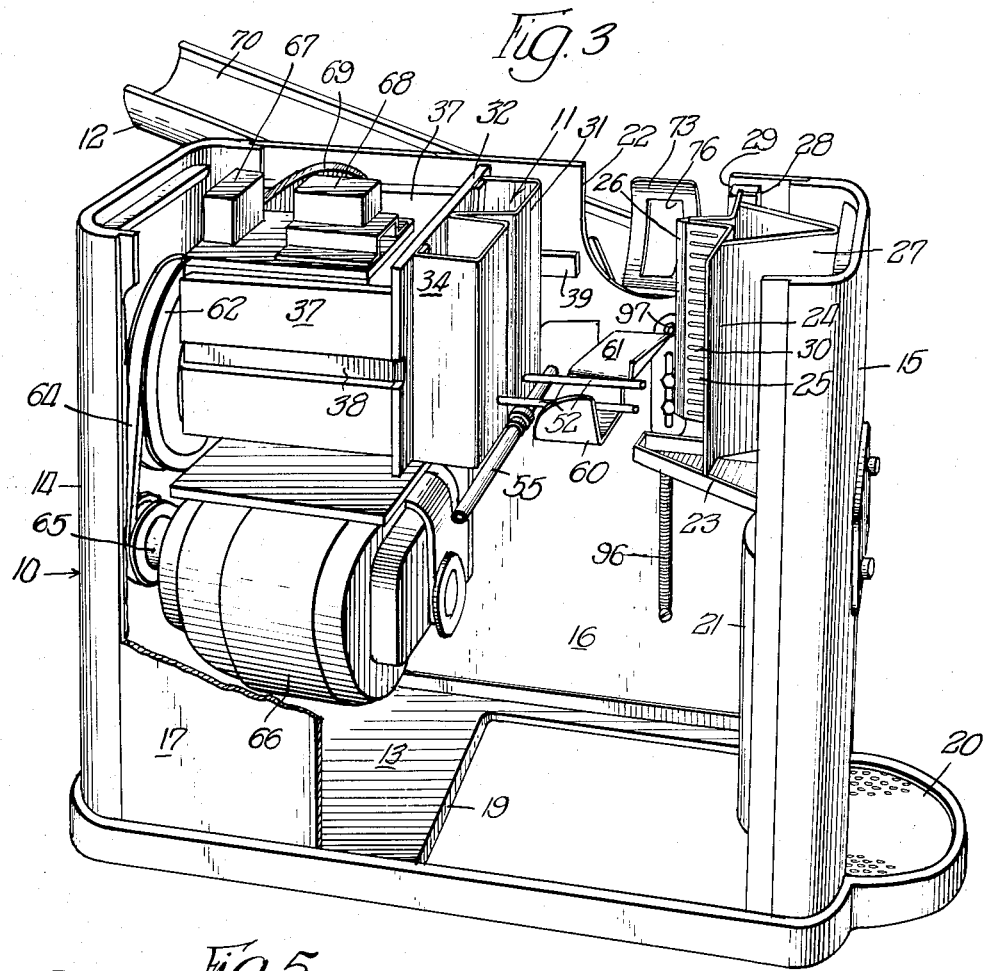
Fig. 3 is a perspective view of the apparatus with portions of the side wall broken away and with the cover plate removed.
Figure 5:
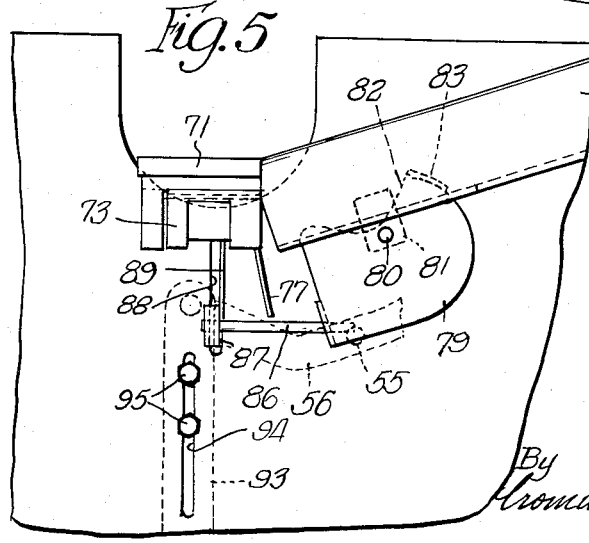
Fig. 5 is a detail side elevation of a portion of the apparatus.
Figure 8:
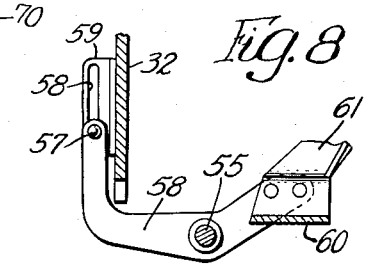
Fig. 8 is a section taken on line 8—8 of Fig. 4.

A support rod 55 extends transversely of the machine between the side plates 16 and 17 and carries thereon an arm 56. The arm 56 carries at its upper end a pin 57 which is engaged in sliding relation in a vertical slot 58 in a connecting bracket 59 which extends rearwardly of the plate 32. At its lower end the vertical arm 56 carries a transversely extending plate 60 which is shaped in the form of a cradle and which is provided at the one side with a platform-like extension 61. In the raised position of the plate 60, as shown in Fig. 3, the platform 61 extends from the fruit supporting rods 52 towards the aperture 22 in the side wall 16 for receiving and guiding onto the rods 52 the fruit as it is delivered from the feeding device 12 into the casing 10.

The change speed device 43 is driven by a pulley 62 which is mounted on the driven shaft 63 of the same and which is connected by a belt 64 with the pulley 65 on the motor 66 mounted beneath the change speed device 43. A suitable safety switch 67 and limit switch 68 may be conveniently located on the top of the speed reducer 43. One of the crank arms 40 carries a cam segment 69 for operating the limit switch to insure completion of a cycle when the switch is actuated to stop the motor.

The feed device 12 which is mounted on the upper portion of the side plate 16 comprises a chute 70 which extends at a downward angle to the bottom of the aperture 22. The lower end 71 of the chute 70 extends horizontally and is apertured at 72 to accommodate a feed gate member 73 which is pivotally mounted at 74 on the side wall 16 beneath the aperture 22. An end wall 75 on the chute end 71 prevents the fruit from passing beyond the feed gate 73. The gate 73 is apertured at 76 to center the fruit and provided with a downwardly projecting stop plate 77 to hold back the next piece of fruit in the chute 70.

The chute 70 is slotted longitudinally at 78 in the lower end to accommodate a vertically positioned movable plate 79. Plate 79 is pivoted at 80 on a bracket 81 so that the upper curved edge 82 extends through the slot 78. A cross abutment member 83 is located at the rear portion of the upper edge. The plate 79 pivots about pivot point 80 to feed the fruit one at a time from the chute 70 to the feed gate 73, the member 83 holding back the next adjacent fruit in the chute 70. The plate 79 is provided at its froward edge with a tongue 84 which is apertured to receive an operating rod 86 which extends rearwardly from the arm 87 which projects outwardly of the side wall 16 of the casing 10 through an elongate slot 88 beneath the feed gate 73. A link 89 is pivotally connected at 90 to the arm 87 and at 91 to a bracket 92 on the bottom wall of the feed gate 73 so that vertical movement of the arm 87 pivots both the feed gate 73 and the feeding plate 79.

The arm 87 is integral with a reciprocable operating plate 93 located on the inside of side wall 16. Plate 93 is slotted at 94 to receive a pair of guide pins 95 for guiding it in a vertically reciprocating path. A tension spring 96 is connected at one end to the bottom of plate 93 and at the other end to the wall plate 16 to urge the plate 93 in a downward direction where the feed gate 73 is in alignment with the feed chute 70.

Figure 4:
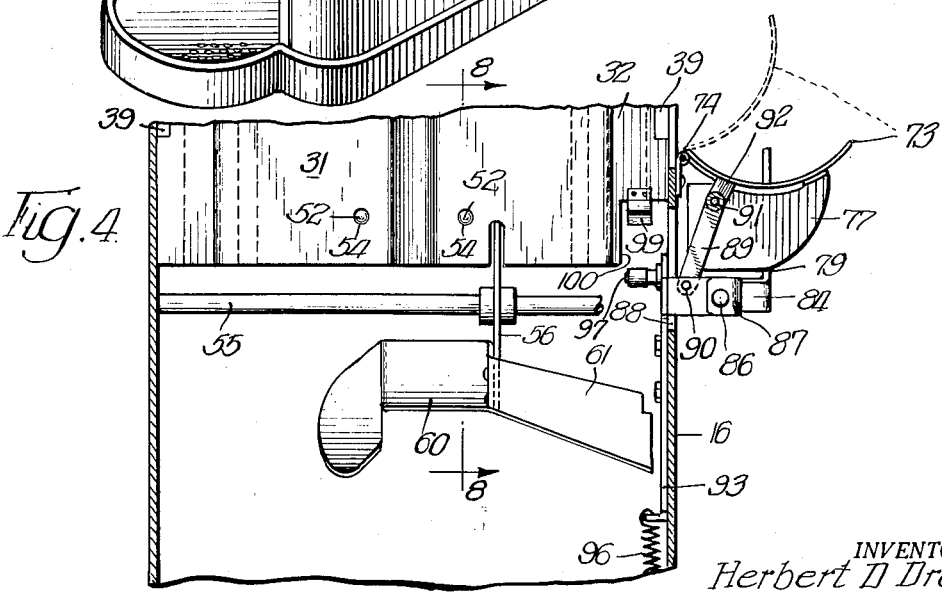
Fig. 4 is a partial transverse section taken between the presser members.

The operating plate 93 is provided at its upper end with a cam roller 97 mounted on an inwardly extending support pin 98 (see Fig. 7). The cam roller 97 is adapted to be engaged and moved upwardly by the end portion of the extension 61 on the pivotally mounted cradle 60 as the cradle 60 pivots forwardly and upwardly into the fruit feeding and supporting position (Fig. 3). Upward movement of the cam roller 97 and plate 93 operates the feed gate 73 to feed the fruit thereon through the side wall aperture 22 and over the cradle extension 61 to the support rods 52. Movement of plate 93 also operates the indexing plate member 79 to permit the next piece of fruit to move into position for movement by gravity to the feed gate 73 as the latter returns to the position shown in Fig. 1. The aperture 76 in the feed gate 73 centers the fruit thereon and the end stop plate 77 holds back the end fruit in the chute 70 as the gate 73 moves into feeding position which is indicated in dotted lines in Fig. 4.

A cam plate 99 is mounted in a recess 100 formed in the lower corner of the carriage plate 32 for engaging cam roller 97 when the carriage moves forwardly if the supporting plate 93 should fail to move downwardly under the pull of spring 96.

In operating the machine a suitable glass or other receptacle is positioned on the platform 20 beneath the forward end of the juice collecting chute 23. A supply of oranges, or other fruit, from which it is desired to extract the juice, are placed in the chute 70 being held therein by the stop plate 83 which extends above the slot 78. The motor 66 is placed in operation to reciprocate the carriage and to move the presser member 31 toward and from the fixed presser member 24. As the carriage reciprocates the transverse cradle 60 is pivoted about the supporting rod 55 and through the connecting linkage feeds the fruit one at a time onto the feed gate 73 which is then tilted upwardly to deliver the individual fruit through the aperture 22 and onto the supporting cradle 61, from which it is transferred to the rods 52 by gravity. The forward movement of presser plate 31 carries the fruit forward on the rods 52 against the knife edge 26 which splits the same into halves. Further movement of the plate 31 crushes the halves against the slotted surfaces in the V-shaped formation at the center of the plate 24. As the juice is extracted from the halves of the fruit is drips down into the collecting chute 23 and thence into the receptacle which is positioned beneath the same. As the plate 31 moves away from the plate 24 and frees the crushed halves of the fruit they drop down past the cradle 60 and through the aperture 19. This cycle of movement is repeated for each individual piece of fruit and the juice may be extracted successively from a plurality of the same by continued operation of the motor 66. When the motor switch is operated to stop the motor 66, if the carriage is not at the end of a cycle, the limit switch 68 is operated by the cam 69 to keep the motor in operation until the end of the cycle. All electric controls for the motor operation may be connected to a suitable dial 101 located exteriorly of the casing 10.

While specific details of construction are shown in the illustrated machine, it will be understood that other details of construction may be resorted to within the spirit of the invention.

We claim:

1. An apparatus for extracting juice from fruit, comprising a supporting frame, a pair of presser plates positioned in vertical facing relation in said frame, bracket members for removably mounting one of said presser plates in relatively fixed position in said frame, a carriage mounting the other of said presser plates in said frame for movement horizontally toward and from said fixed presser plate, one of said presser plates having a vertically extending squeezing recess therein, the other of said presser plates having a cooperating vertically extending squeezing projection thereon, a knife edge on said projection, fixed fruit supporting guide rods extending between said presser plates, means for delivering successive pieces of fruit to a position laterally of said guide rods, a pivoted cradle member adapted to pivot to a position laterally of said guide rods for guiding said fruit from said delivery means to said guide rods, and means connected to said carriage for pivoting said cradle member to an inoperative position in response to forward movement of said carriage, whereby successive pieces of fruit may be positioned on said rods between said presser plates when they are in separated position to be cut into halves by said knife edge and squeezed between said presser plates upon forward movement of said carriage.

2. An apparatus for extracting juice from fruit, comprising vertically positioned presser members, means mounting one of said presser members in a relatively fixed position, means mounting the other of said presser members for reciprocating movement horizontally toward and from said fixed presser member, said presser members having cooperating vertically extending central ridge and groove formations, a vertical knife edge between said presser members, means for delivering successive pieces of fruit to a position laterally of said presser members in timed relation to the movement of said movable presser member, means for supporting the fruit between said presser members, and a tiltable cradle swingable from a position beneath said presser members to and from a position adjacent said fruit delivering means for guiding the fruit therefrom to a position between the ridge and groove formations of said presser members and on said supporting means whereby said fruit will be cut by said knife edge and crushed between said presser members upon movement of said movable presser member toward said fixed presser member, and the crushed portions of the fruit will be free to move away from said presser members after the crushing operation.

3. An apparatus as recited in claim 2 wherein said fruit delivery means comprising a supply chute, a movable gate at the end of said chute which is located to deliver fruit to said cradle when said cradle is positioned adjacent said fruit delivery means and means for operating said gate and said cradle in timed relation to the movement of said movable presser member to deliver fruit successively from the supply chute to said cradle.

4. A machine for extracting juice from fruit, comprising a pair of cooperating vertically positioned presser members arranged in said machine, one of said presser members being mounted in a relatively fixed position, the other of said presser members being mounted for movement horizontally toward and from said fixed presser member, said presser members having cooperating ridge and groove formations for crushing the fruit therebetween, a knife edge mounted on said fixed presser member for cutting the fruit into parts, means for delivering a piece of fruit to a position laterally of said presser members when they are in separated position, means for supporting the fruit between said presser members, and a tiltable cradle having a side extension, means connected to said movable presser member for tilting said cradle member into and out of a generally horizontal transfer position with said side extension bridging the space between said fruit delivery means and said fruit supporting means for guiding the fruit into position between the presser members and on said supporting means, whereby the fruit will be cut into parts and crushed between said presser members upon movement of said movable presser member toward said fixed presser member and said cradle will be tilted by movement of said movable presser member to permit the crushed parts to move by gravity away from said presser members when said crushed parts are released by movement of said movable presser member away from said fixed presser member.

5. An apparatus for extracting juice from fruit, comprising a supporting frame, a pair of vertically positioned plate-like presser members, means for removably mounting one of said presser members in a relatively fixed vertical position in said frame and a reciprocable carriage in said frame mounting the other of said presser members for movement horizontally toward and from said fixed presser member, one of said presser members having a vertically extending central ridge formation provided with a knife edge thereon and the other of said presser members having a groove formation arranged for cooperation with said ridge formation, laterally spaced fruit supporting rods extending horizontally in the path of movement of said carriage with the free ends thereof terminating short of said fixed presser member, a fruit supporting cradle pivotally mounted on a cross support and having a lateral extension thereon, said cradle being adapted to be pivoted to a position between said presser members in cooperating relation with said fruit supporting rods and with the lateral etxension thereof in a generally horizontal position adjacent said rods to receive and guide fruit onto said rods, means for pivoting said cradle in timed relation to the movement of said carriage to move the cradle out of its fruit supporting position whereby successive pieces of fruit may be positioned on said rods between said presser members when they are in separated relation and thereafter the fruit will be cut into halves by said knife edge and crushed between said presser members upon forward movement of said carriage, and said cradle will be moved out of its fruit supporting position to permit gravity discharge of the crushed fruit upon retraction of said carriage.

References Cited in the file of this patent

UNITED STATES PATENTS

| 808,861 | Mosteller | Jan. 2, 1906 |
| 1,645,236 | Hedlind | Oct. 11, 1927 |
| 2,067,555 | Walker | Jan. 12, 1937 |
| 2,522,800 | Quiroz | Sept. 19, 1950 |
| 2,535,592 | Mueller | Dec. 26, 1950 |
| 2,552,171 | Hagerty | May 8, 1951 |
| 2,560,096 | Elterman | July 10, 1951 |
| 2,629,317 | Nelson | Feb. 24, 1953 |

FOREIGN PATENTS

| 249,206 | Switzerland | Mar. 16, 1948 |
| 305,888 | Italy | Feb. 18, 1933 |